T. K. IRWIN.
TREATMENT OF SEWAGE.
APPLICATION FILED AUG. 16, 1913.

1,083,833.

Patented Jan. 6, 1914.
4 SHEETS—SHEET 1.

T. K. IRWIN.
TREATMENT OF SEWAGE.
APPLICATION FILED AUG. 16, 1913.

1,083,833.

Patented Jan. 6, 1914.
4 SHEETS—SHEET 2.

Witnesses
Jas. K. McCathran
David R. Wagner

Thomas Kemplay Irwin, Inventor;
By E. G. Siggers
Atty.

T. K. IRWIN.
TREATMENT OF SEWAGE.
APPLICATION FILED AUG. 16, 1913.
1,083,833.
Patented Jan. 6, 1914.
4 SHEETS—SHEET 3.
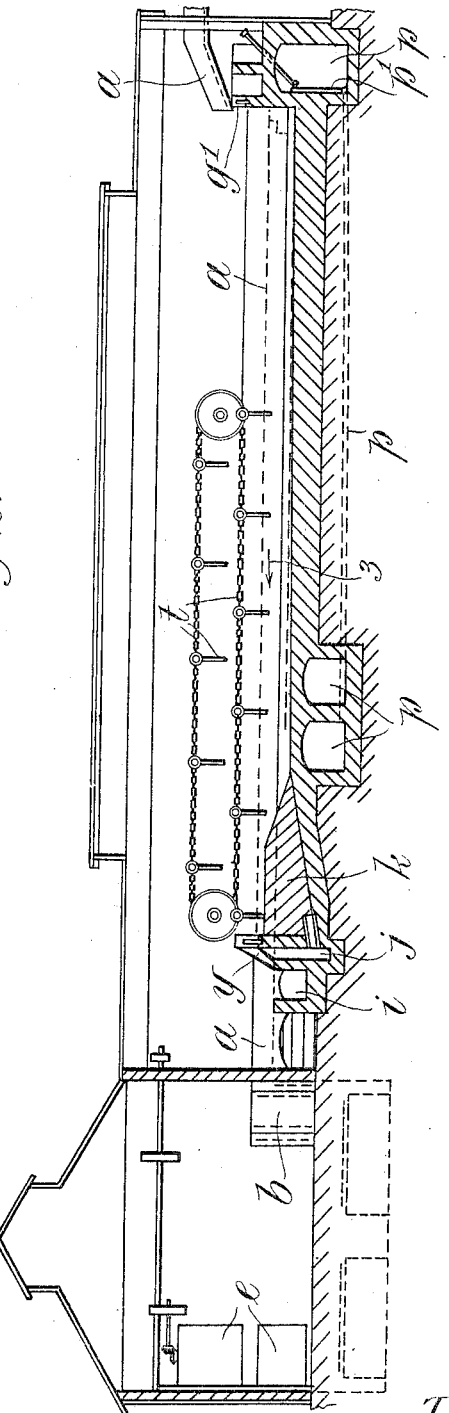
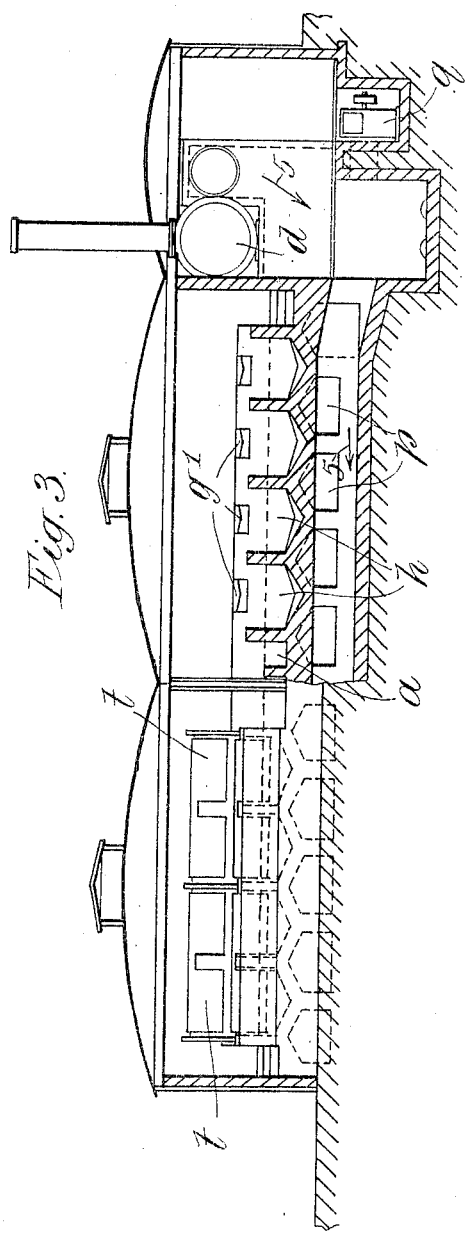
Witnesses
Jas. K. McCathran
David R. Wagner
Thomas Kemplay Irwin, Inventor
By C. G. Giggels, Atty

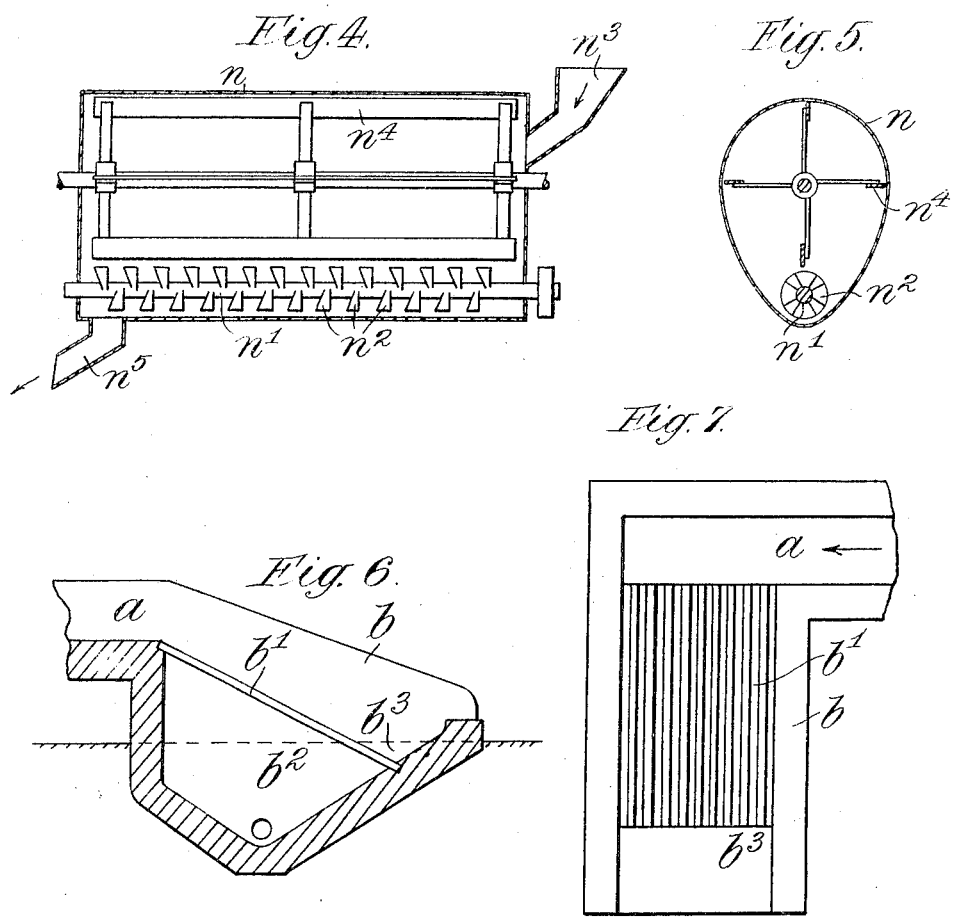

UNITED STATES PATENT OFFICE.

THOMAS KEMPLAY IRWIN, OF LONDON, ENGLAND.

TREATMENT OF SEWAGE.

1,083,833.  Specification of Letters Patent.  Patented Jan. 6, 1914.

Application filed August 16, 1913. Serial No. 785,078.

*To all whom it may concern:*

Be it known that I, THOMAS KEMPLAY IRWIN, a subject of His Majesty the King of England, residing at 5 London Wall Buildings, in the city and county of London, Kingdom of England, have invented certain new and useful Improvements Relating to the Treatment of Sewage, of which the following is a specification.

This invention relates to improvements in the treatment of sewage whereby it is rendered serviceable for fertilizing and refers to the process of treating sewage by the addition of yeast in order to separate the sludge by the fermentation set up. In such a process the sludge is forced to the top and may be collected therefrom and utilized.

Now according to the present invention the whole process is carried out in a continuous mechanical manner and preferably with the use of the apparatus hereinafter described.

In the process above referred to the separation of the solids from the liquid portion of the sludge takes place during fermentation, and the special feature of the said process is in the fact that almost all the solids are raised to the surface, in contradistinction to other processes wherein the greater portion of the solids is precipitated to the bottom. Advantage is taken of this special feature to deal with the fermented matter as hereinafter described.

In order that my invention may be more fully understood I will hereinafter describe the same with reference to the accompanying drawings in which:—

Figure 1:
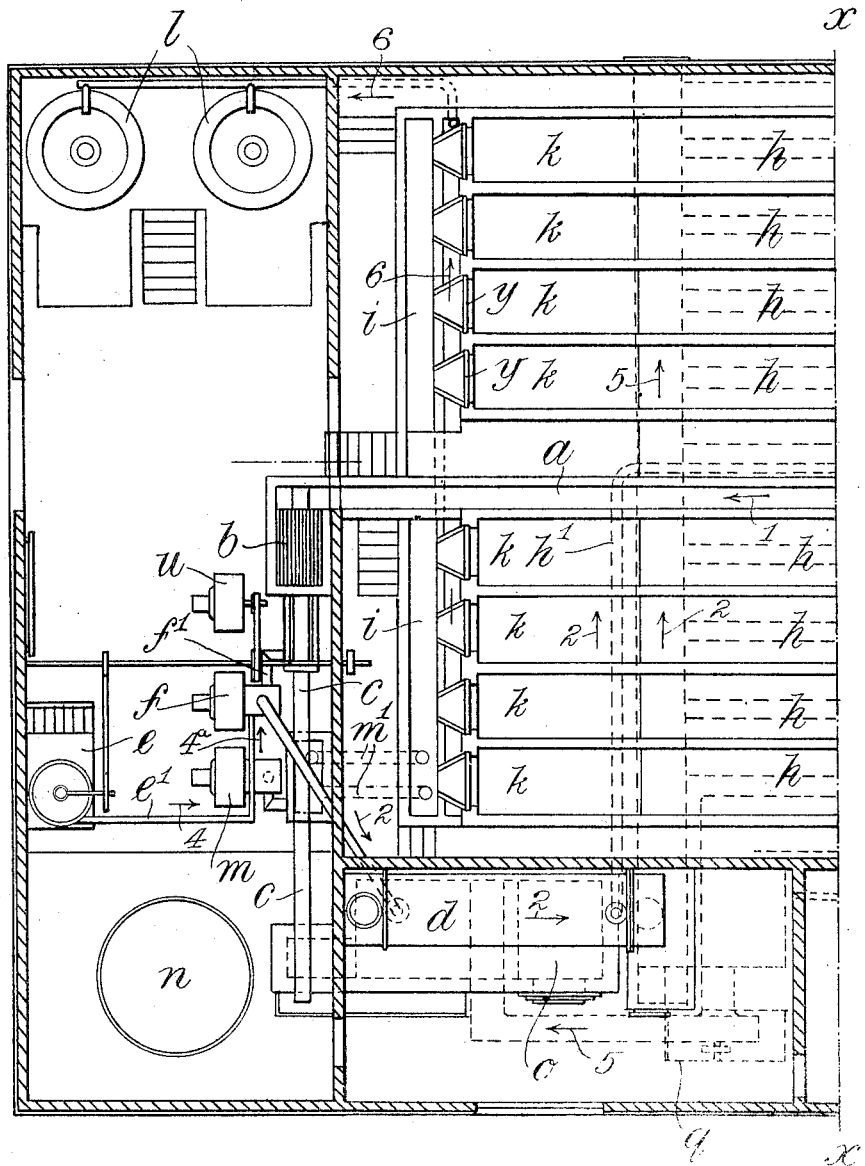
Figure 1:
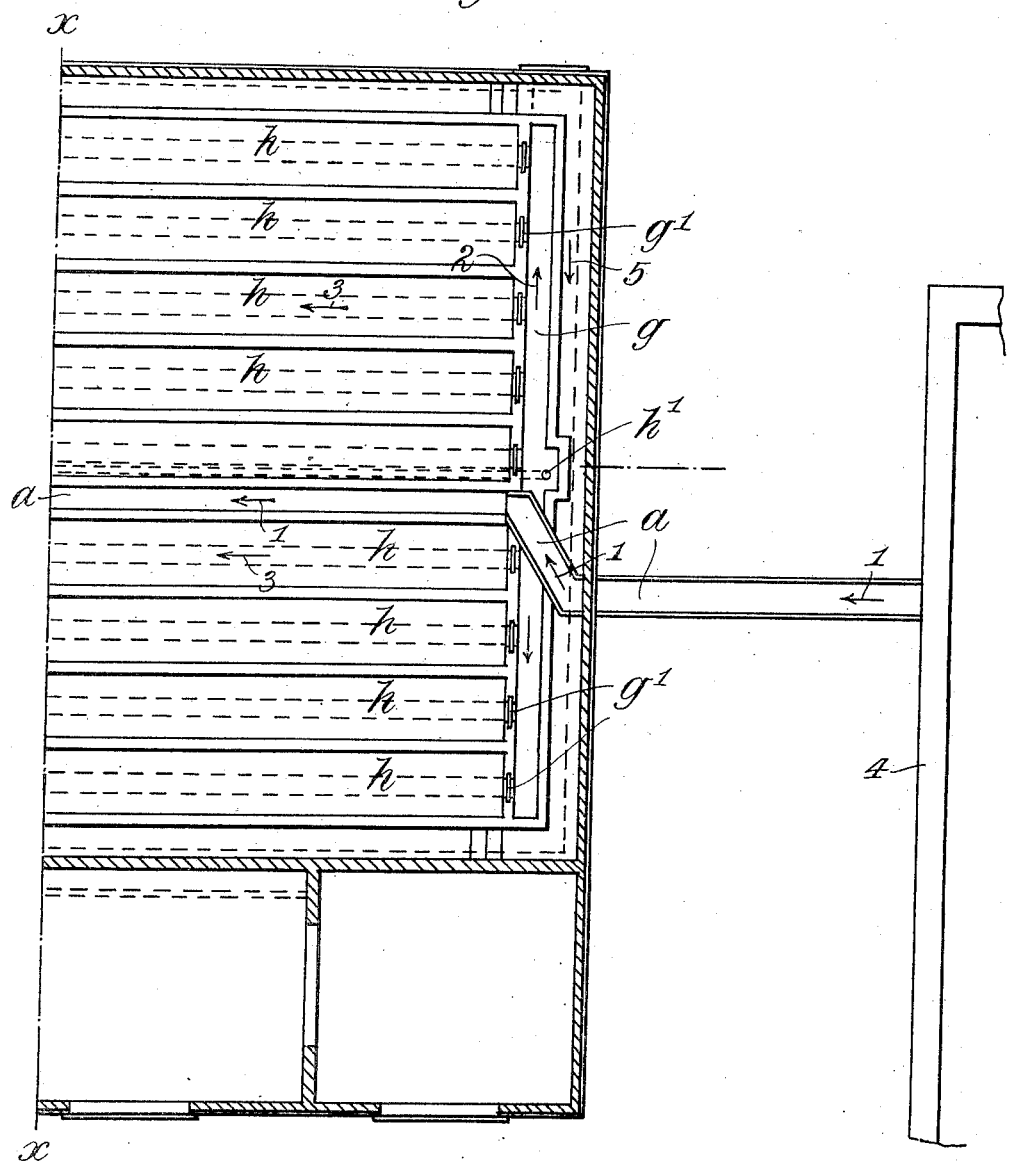

Figure 1 is a plan view illustrating one suitable and convenient arrangement of the apparatus; Fig. 2 is a longitudinal sectional elevation thereof; Fig. 3 is a transverse sectional elevation. Fig. 4 is a diagrammatic longitudinal section of one form of drier. Fig. 5 is a cross section thereof. Fig. 6 is a section of the sludge grid pit; and Fig. 7 is a plan thereof.

For use in carrying out this process I employ (A) apparatus for measuring and mixing the sludge and ferment; (B) apparatus for heating the mixture to the desired temperature; (C) receptacles in which the process of fermentation and separation may take place; (D) means for partly de-watering the fermented material; and (E) means for drying the de-watered material and reducing it to a suitable powdered condition.

As shown the improved apparatus comprises a sludge tank such as 4 from which the sludge is led by way of inlet troughs $a$ to a sludge grid pit $b$ having grids or bars $b'$ through which the sludge passes into a trough $b^2$, the large matter, intercepted, being collected at $b^3$. The sludge is then pumped, by means of a pump $f$ by way of pipe $f'$ together with a supply of yeast from the yeast tank and mixer $e$ and pipe $e'$ in fixed proportions, to the sludge heater $d$. A conveyer $c$ is provided to convey the sludge refuse collected on the part $b^3$ of the grid pit $b$ to the furnace $o$ of the heater $d$ as shown. The sludge conveyed to the vessel or heater $d$ is heated through contact with suitably disposed heating surfaces and thereby raised to the temperature most suitable for fermentation, which experience shows to be about 80° Fahr. The vessel or heater $d$ is preferably as shown elevated so that the heated fermenting mixture of sludge and yeast will flow therefrom by gravity to the fermenting receptacles $h$ by way of the pipe $h'$ and the sludge and yeast distributing trough $g$. The receptacles $h$ are preferably in the form of a plurality of elongated troughs arranged side by side as shown and they are constructed of such cross-sectional area and length that a continuous flow of the mixture over the regulating sills $g'$ and through them may be maintained, at such a speed as will insure that whereas the warm mixture of sludge and ferment is constantly entering at one end from the distributing trough $g$, a completely fermented and separated product will flow off at the other end into the receiver-trough $i$. Practical tests indicate that the period of fermentation is from 18 to 24 hours, and, therefore, the time for the passage of the mixture through these tanks or troughs $h$ must be at least 18 hours. To insure satisfactory separation, this period should always be as long as is practicable and economical. As hereinbefore mentioned the solid portion of the sludge after fermentation, rises to the surface and floats, in effect, upon the liquid portion or effluent.

Means for the constant removal of the risen fermented material from the outlet end of the troughs $h$ is provided, the mechanism such as the conveyers $t$ for this purpose being arranged to move along the troughs at the same rate as the mixture in them. In this manner no disturbance is created, and no interference with the process of fermentation and separation occurs. The temperature of the mixture in the troughs is maintained by means of tubes or ducts $p$ under the troughs $h$ and through which hot air or gases or steam may be passed, its passage being regulated by dampers $p'$.

At the end of the fermenting troughs $h$ are provided effluent filter beds $k$ which connect with a common effluent receiver trough $j$ into which the effluent passes. The fermented sludge passes over outfall sills $y$ to the aforesaid trough $i$ from which it is pumped by means of a pump $m$ and pipes $m'$ to a suitable form of drier $n$, hereinafter described.

The fermented effluent portion of the sludge removed from the trough $j$ contains about 80% of water and a considerable percentage of this is now eliminated by means of centrifugal machines $l$ the cages of which are constructed with an annular chamber to carry suitable filtering material and are also provided with means for the rapid removal and replacement of the said material. In these machines the separation of the solids from the greater part of the remaining liquid or effluent is effected. They are further equipped with mechanism for the continuous or periodic removal of the deposited solids. The effluent from these machines $l$ may be again subjected to further filtration or allowed to flow away. The deposited solids, after removal from the centrifugal machines are conveyed to a suitable apparatus for drying and pulverizing them. In the condition in which the solids leave the said centrifugal machines $l$ and enter the drying apparatus they are very gummy, close in texture, and extremely tenacious and are consequently difficult to dry.

Precipitation of the divided organic and nitrogenous matter in the effluent is facilitated and its capture in the hydro-extractor machines $l$ is insured by the addition of apparatus, to introduce into the effluent, as it passes away from the fermenting troughs $h$,—lime, alum, or other suitable precipitating medium. Further in order to prevent the escape of volatile combinations of nitrogen, provision is made for the admixture with the sludge, either before or after fermentation, of a chemical (such as superphosphate) which will retain them through and after the drying process.

The essential feature of the drier, one form of which is shown in Figs. 4 and 5, is, therefore, means for breaking up the entering solids into small particles so that they may come into intimate contact with hot air and gases and are thus rapidly and economically dried. This is effected in a horizontal approximately cylindrical chamber $n$ in the lower part of which is a rapidly rotating shaft $n'$, fitted with blades $n^2$, which receive the entering material as it falls from the inlet $n^3$, break it up, and project it into all parts of the chamber, catching it again as it falls and repeating the action continuously during the progress of the material along the chamber. Suitable slowly rotating scrapers $n^4$ may be fitted in the upper part of the chamber.

Hot air or gas is passed around and through the drier chamber and the moisture from the drying material is carried off, with the hot air or gases, by a chimney or fan.

The rotating blades $n^2$ effectively pulverize the material as it dries and deliver it at the outlet $n^5$ in a dry powdered form. More than one chamber may be used and the speed of the shafts reduced as the material becomes drier. It should be understood that the above described drying apparatus *per se* forms no part of the present invention.

The working of the whole apparatus may be readily traced as the flow of fresh sludge is shown by arrows 1; the mixture of sludge and yeast to and from the heater $d$ by arrows 2; the fermented sludge by arrows 3; the yeast by arrows 4ª; hot air by arrows 5; and the effluent by arrows 6.

The working parts of the whole apparatus are run from a common motor $u$ which also drives a hot air exhaust fan $q$ as shown.

What I claim and desire to secure by Letters Patent of the United States is:—

1. The continuous process for the treatment of sewage, which consists in first mixing yeast with the sludge, applying heat to the mixture and then delivering the mixture to a suitable receptacle to cause a separation of the sludge and effluent by fermentation.

2. The continuous process for the treatment of sewage, which consists in first mixing yeast with the sludge, applying heat to the mixture, delivering the mixture to a suitable receptacle to cause a separation of the sludge and effluent by fermentation and de-watering the effluent.

3. The continuous process for the treatment of sewage, which consists in first mixing yeast with the sludge, applying heat to the mixture, delivering the mixture to a suitable receptacle to cause separation of the sludge and effluent by fermentation, drying the de-watered material, and reducing the latter to a powder.

4. The continuous process for the treatment of sewage, which consists in first mixing yeast with the sludge, applying heat to the mixture, delivering the mixture to a suitable receptacle in which fermentation and separation of the sludge and effluent takes place, de-watering the effluent in a centrifugal machine, and drying the de-watered material.

In testimony whereof I have signed this specification in the presence of two subscribing witnesses.

THOMAS KEMPLAY IRWIN.

Witnesses:
 THOS. K. LOCKINGTON,
 FRANK BLAKEY.